US006288771B1

(12) United States Patent
Greiner

(10) Patent No.: US 6,288,771 B1
(45) Date of Patent: Sep. 11, 2001

(54) METHOD AND DEVICE FOR PRODUCING POSITIVE IMAGES

(75) Inventor: Luitpold Greiner, Bamberg (DE)

(73) Assignee: ISI Fotoservice GmbH, Bamberg (DE)

( * ) Notice: Subject to any disclaimer, the term of this patent is extended or adjusted under 35 U.S.C. 154(b) by 0 days.

(21) Appl. No.: 09/585,485

(22) Filed: Jun. 2, 2000

Related U.S. Application Data

(63) Continuation of application No. 09/297,149, filed as application No. PCT/DE97/02481 on Oct. 25, 1997, now abandoned.

(30) Foreign Application Priority Data

Oct. 29, 1996 (DE) ............................................. 196 44 902

(51) Int. Cl.[7] .................................................. G03D 27/52
(52) U.S. Cl. .................................. 355/40; 355/41; 355/77
(58) Field of Search ................................. 355/38, 40, 41, 355/77, 27–29

(56) References Cited

U.S. PATENT DOCUMENTS

| | | | | |
|---|---|---|---|---|
| 5,383,029 | * | 1/1995 | Kojima | 358/403 |
| 5,574,533 | * | 11/1996 | Itoh | 396/639 |
| 5,889,578 | * | 3/1999 | Jamzadeh | 355/41 |

FOREIGN PATENT DOCUMENTS

| | | | | |
|---|---|---|---|---|
| -2513873-A | * | 11/1983 | (DE) . | |
| -2066177-A | * | 1/1986 | (DE) . | |
| -4233228-A | * | 4/1993 | (DE) . | |
| -4210171-A | * | 6/1993 | (DE) . | |
| -4340757-A | * | 6/1994 | (DE) . | |
| -580293-A | * | 1/1994 | (EP) . | |
| -0652480-A | * | 5/1995 | (EP) . | |
| -0735420-A | * | 10/1996 | (EP) . | |
| 10-161248 | * | 6/1998 | (JP) | ........................................ 355/40 |
| -05660-A | * | 4/1992 | (WO) . | |

OTHER PUBLICATIONS

"Digital Print System: AGFA DPS", brochure of 1999.*

* cited by examiner

Primary Examiner—D. Rutledge
(74) Attorney, Agent, or Firm—Paul Vincent

(57) ABSTRACT

Conventional methods for producing photographic copies of film strips are highly intensive in terms of manual labor and involve a large number of different operating processes. In particular, the systems employed are not optimally designed for repeat orders. A new method is therefore proposed with which all of the images on the film strip are scanned completely during the film strip development process, and the scanned image data are stored for each image in a mass memory forming part of the production device. The first positive and all further positive images required for repeat orders are produced exclusively from these stored image data. The device according to the invention comprises a scanner disposed external to and immediately at the outlet of the strip film development device for completely scanning the film strip images.

13 Claims, 2 Drawing Sheets

METHOD AND DEVICE FOR PRODUCING POSITIVE IMAGES

This application is a continuation of application Ser. No. 09/297,149 filed Apr. 26, 1999 (now abandoned) which is a 371 of PCT/DE97/02481 filed Oct. 25, 1997 and claiming priority of DE 196 44 902.2 filed Oct. 29, 1996 the complete disclosure of which are hereby incorporated by reference.

BACKGROUND OF THE INVENTION

The invention concerns a method and device for generating positive images, wherein films are developed and positive images produced. The invention also concerns a device having a continuous film processor and equipment for making positive images.

The number of photographic pictures taken at various occasions has been increasing worldwide for many years. In most cases, color-negative films are used. The exposed films (e.g. film rolls protected inside a canister) are usually brought to a delivery point from which they are transfered to an external photofinishing laboratory. The films are developed, for example, using a continuous film processor and, in a second step, positives pictures ("prints") are generated from the developed films, normally using photographic paper. The developed films (negatives) and the related prints are placed in an common envelope, which is returned to the customer.

The negatives are usually arranged in strips including a series of five or even more frames in dependence on the camera format and the type of envelope. The negatives can also be returned within an original cartridge which was used in the camera.

In recent years "Minilabs" have become popular, with which the essential photo-technical activity is performed directly at the delivery point location. Except for certain specific details (e.g. single film processing instead of splicing films to a large film roll) the processing is identical to that in the external (large) photographic laboratory. This is particularly the case for all problems related to handling of films and prints, in particular, with regard to logistic requirements.

After having seen the pictures, the customer often wants to acquire additional pictures from the newly developed film. In many cases only certain specific prints of the entire set are desired. The number of copies may vary over a wide range. For ordering, the customer must precisely specify the negativeframe (which may be numbered) and the number of prints ("reorders") which are to made. Since the complete film-strips, consisting of a plurality of negatives, are used in the standard re-order procedure, one must ensure that re-order prints are only manufactured from those pictures which are desired, and in the desired number of copies. Minimizing possible sources of error is therefore an important task in the re-order business.

DE-C1-42 10 171 discloses use of a standardized machine readable re-order card. The customer or vendor thereby fills out the re order-card, specifying the desired frame numbers and the type and number of copies. At the production location, these data are collected by a card reading unit and are transferred, together with the negatives strips, to conventional photographic printing units. In this conventional photographic printing environment, the negative strips must be extensively handled, adjusted, measured, analyzed and transported. At the end of this multi-step process, the negatives and re-order prints must be combined in a suitable way to ensure that the original negatives are returned to the customer together with the ordered prints in one common envelope, including invoicing information for the entire order.

When reordering using the re-order card in accordance with DE-C1-42 10 171, the customer must not only specify the frame number and number of prints, but also fields related to the print format and print surface, details of print design (e.g. white frame), and even blank fields for future service possibilities (new formats etc.) must be taken into account. This procedure causes additional potential sources of error. If the customer actually uses the full range of print formats, surfaces and designs, the logistic and technical problems at the photo finishing site grow exponentially, since each negative frame of each desired picture must be used at each printing device for the respective picture size, surface, design, etc. This is particularly problematic when the printing procedure for the re-order pictures is automatized. In this case, negative strips are glued together on a supporting ribbon band to produce a common roll having many strips from various customer orders, which is then passed to the automatic printing machine. In addition, an electronic copy of the order data must be established containing all order information required by the printing machine for creating the desired pictures using the respective negative frame as an image source. Clearly "mixed orders", wherein several different pictures must be printed (varying in size, surface, design, and batch number) from one negative frame create great logistic, technical and economic problems.

Additional significant problems arise in this procedure when, at the end of the printing process, with the pictures usually still joined together as a continuous band of pictures, picture quality inspection is effected to determine, that certain pictures must be printed again due to lack of picture quality (hue, density, scratches, dust, spots etc.). The associated prints must be marked and sorted out in a cutting device. The corresponding negative frame must also be sorted out, and the entire procedure repeated, in some cases, with improved correction data concerning hue and density.

When this final step is correctly performed, processing of the customer's order is terminated with the inclusion of price information on or in the customer's order envelope which is also passed to a central computer. In order to reduce manual data entries concerning the order, DE-C1-42 10 171 introduces the re-order card to a suitable reading unit. After insertion of a re-order card, the reader checks whether or not the fields marked on the recorder card ("aspect ratios" and "surface") agree with the previously recorded basic data. Should this be the case, processing is continued. Should the data differ, the reader automatically blocks further processing. In this way, errors arising from improper execution of the original order data, are automatically prevented.

DE-25 138 73 describes a method for the processing of orders for the fabrication of photographic copies from source images on short film. In this method, so-called data strips, which accommodate machine readable data, are mounted to the films. The film is delivered in envelopes, indicating film format, size and number of copies, as well as with machine readable data indicating the requestor or delivery location and the order number. In the photofinishing laboratory, large rolls of negative strips are formed and sorted according to negative and print formats, surface, design etc. At the end of the printing procedure, the ordered prints are present in the form of a continuous band and must be cut, separated and sorted in direct or reverse order of printing using a sorting and finishing facility and merged with the submitted film strips and order envelopes. The produced pictures are totaled and the processing data are read to determine the cost of the order for invoicing. The data strips carry the negative's frame number, the number of copies, the print format and design in a machine readable manner to facilitate reliable merging of the printed pictures, the negative frames and the envelope of the respective order. The data concerning delivery point and/or order number will be read from the order envelope by a preparation device and transferred onto the data strip. The data strips with the attached negative frames are then sorted with respect to film format, print format and design, including the order envelopes. Finally, the (rolls of) negatives, including the data strips, are fed to a photographic printing device adapted for printing on strip media.

The preparation device comprises a data reading unit for information concerning delivery point and order number of the envelope, an input device for data concerning film format, size, and number of desired copies and a device for writing extracted and entered data onto the data strip in a machine readable manner. An additional sorting device handles the data strips with attached negative frames and the order envelopes. Pair-wise disposed magazines maintain the sequence and order type (print format, surface, etc.).

The photographic printing device comprises a wheel printing unit, including an adapter for magazines containing the data strips with the attached negative frames, a handling unit for the data strips, a data input device for order information (e.g. number of prints), a carriage device with means for positioning the data strips including the negative frames, and a cycle control unit for the photographic printing process. A suitable sensor detects the "end of order" mark on the data strip and transfers it to the band of exposed photographic paper.

To merge prints, negatives and order envelope after the printing and development process, the unit contains a sorting and dispatch facility. This sorting and dispatch equipment comprises a cutting unit controlled by picture marks on the band of prints and including a sensor for "end of order" marks on the band which disables the cutting unit for the print ribbon when necessary. Handling and reading units for the data strips and envelopes are also provided to ensure correct merging of negatives, prints and order envelope.

Although portions of this procedure for processing re-orders are automated, a substantial degree of manual handling is required. The person operating the preparation unit must remove the data strips (with the attached negatives) from the order envelope and place them onto an inspection screen, where the negatives of the desired prints are checked for suitability. The position number of the relevant negatives on the strips must then be entered into the data input unit together with information concerning print size and number of prints. The empty order envelope is fed into a reading unit. The input unit stores this information until the respective data strip is fed into the unit and the stamping process on the data strip is performed. Additional information (customer, total number of strips of the current order etc.) is included. The validity of all data can be checked by the operating person using a display unit.

After stamping, transfer units move the data strips and order envelopes to a sorting device which sorts them into separate magazines according to print size data. The magazines containing the data strips are transferred to photographic printing devices. The data strips must be accurately fed into the printing unit. This is rather difficult since the composite samples (data strip attached to the film negative strips of various lengths) are tedious to adjust. When exposure has been performed, further development, inspection steps and invoicing related operations are carried out, as described above.

The procedure can only be used for customer orders requesting one picture size. In the event of mixed formats, the order must be split accordingly which increases logistic problems to an even greater extent.

DE-C2-20 66 177 discloses a device comprising a unit to cut single prints out of a roll of pictures using marks for each single print and end of order marks. The device also comprises a resetting picture-counter and a pricing and printing unit.

EP-06 52 480 discloses a method for processing filmstrips for re-orders. The negative strips are thereby fed into a preparation unit, where they are attached to a continuous support band and merged into a common roll which is then transferred to printing units. The gluing process must be performed very accurately, since the precision of negative positioning governs the feed behavior and printing quality in the subsequent printing units. Clearly, the amount and the quality of the materials used play an important role. This system also requires additional tools and operation handling steps to execute re-orders from customers.

DE 42 33 228 A1 describes a photographic copying system having electronics for accelerating the printing of pictures from photographic (negative) films. The device comprises a continuous film processing unit, an optical image sensor unit, an image processing unit and a picture printing unit. The image sensor unit scans the (negative) film during development thereof and is positioned between the development stage and the final drying stage. The image processing unit executes digital correction algorithms taking into consideration film-type, frame-type, gamma adaptation, printing characteristics and customer demands. The printing device creates a picture in accordance with the collected image data. The device may be designed as a printer/processor combination.

DE 43 40 757 A1 discloses a similar combined processing/printing/processing unit. In contrast to DE 42 33 228 A1, the scanning unit is positioned after the drying stage of the (negative) film processor. The printing devices includes two exposure systems for light sensitive printing material, to create pictures or specific additional image feature (for example index prints) in one pass per order.

Both systems have significant disadvantages with regard to re-orders from the customer or re-makes (quality failed prints which must be remade in the laboratory after the first printing step), since the negative strip cannot be fed through the apparatus a second time. In this case a second scanning procedure, including a second external scanning device would be necessary, entailing even more devices and increased handling and costs.

In DE 42 33 228 A1, the image sensor is within the chemical rich environment of the film processor. Aggressive chemical vapors and high temperatures of about 40° C. have to be taken into account, requiring extensive encapsulation as well as cooling devices to decrease noise inside the CCD-image sensor. Moreover, both systems physically require the original negative frame for re-make or re-order prints.

EP 07 35 420 A1 discloses a device for creating positive images using image data on the back side of the print. Since negative image information is usually of high volume, the writing of data on a print's back side requires very high storage density and excessive use of data compression algorithms. Special devices are therefore needed for reading and writing the image information on the backside of the print. Clearly, the customer also needs the print in order to be able to request newly desired copies. The common practice of gluing personal prints in albums, of cutting, of putting them into large frames or even pinning them to the wall clearly shows the very limited practical use of the proposal according to EP 07 35 420 A1.

Despite the large number of sophisticated specialized units required by state of the art devices, additional manual handling operations and detailed organization schemes are nevertheless needed to create positive prints (copies) of exposed photographic films. Error reduction for reorders and cycle times for print generation have not been significantly reduced despite the large number of devices and the additional special operations involved.

It is the underlying purpose of this invention to improve the state of the art methods and devices for making positive images described above with respect to maximizing throughput and minimizing handling procedures, without requiring a second scanning process or a second scanning device for the films.

SUMMARY OF THE INVENTION

This purpose is achieved with a method for creation of positive images, wherein the film is developed and positive images are produced, wherein the complete set of exposed frames on the film is completely scanned and the sampled data of each frame are recorded on a digital mass storage device associated with a device in accordance with the invention, wherein the first positive print of each frame and all further or subsequently created prints of the same frame (remakes and re-orders) are exclusively created from the recorded image data. According to the invention, the film is scanned during development. The respective scanning unit is positioned directly downstream of the drying stage of a continuous film roll processor. The sampled image data for each single frame are immediately stored on a mass storage medium capable of storing data from a very large number of frames. The invention advantageously avoids mistakes made by operational personnel, since the in-line scanning of the film is performed automatically at the feed velocity of the continuous film processor.

A substantial advantage is clearly evident when re-makes of first-pass-prints are considered. Re-make prints occur frequently, since even highly sophisticated automatized printing algorithms still make mistakes. In this event, using the method of the invention, it is not necessary to select the (negative) frame of the respective print in order to once more feed it through the entire printing line. In this manner, all possible mistakes which can occur during this multi-step procedure are completely avoided, since the original (negative) frame is not needed to create the improved re-make print. The digital data on the mass storage device will do the job.

In the event of re-order prints by the customer, the unique advantage of the solution according to the invention is even more pronounced. The customer must not select his negatives, there is no attachment of data strips or support bands, there are no handling problems with regard to excess negatives (e.g. negatives which are present on the film strip, but which are not to be copied) and the print quality of the reorder print is identical to that of the first print, since both are created from the same set of sampled data.

In addition, mixed orders (different print-sizes/surfaces/designs) are greatly simplified, since only the sampled data of the frame must be processed inside the laboratory and not the frame itself. Finally, the invention absolutely minimizes the impact of aging effects on the color layers (dyes) of the frame, since the image data sampling process takes place as early as possible, immediately after the drying stage of the film development process. Even if the negative is subsequently lost, it is still possible to create prints. The method and device in accordance with the invention therefore also provide a backup for the customer's pictures.

The above purpose in accordance with the invention is also achieved by a device having a continuous film processor and device for making positive images, wherein an optical sampling device (scanner) is positioned outside of and directly following the exit of the continuous film processor for complete scanning of the frames of the film, wherein all sampled image data of the respective film are recorded on a high volume storage device, and the first positive print as well as all re-order and re-make prints of each frame of the film are exclusively produced in the equipment facility from those stored image data.

The device according to the invention has the advantage that, in the event of re-make and re-order prints of certain frames there is no feeding through a preparation station (such as in EP A1 06 52 480, where the frames must be attached to a support band and a large film roll of attached negatives must be formed). By avoiding film rolls, all mistakes which compromise picture quality and increase processing time for the customer's order can be reliably avoided.

In a preferred embodiment of the invention, a memory address, mapped to each single stored frame, is also printed on the positive print.

In an improvement of this embodiment, this memory address is printed in human readable and/or machine readable manner for later use as an order number.

According to prior art, re-orders are often processed using a procedure with which so called data strips are mounted to short strips of negative frames (see for example DE C2 25 13 873). 1, 2, 3, 4, 5 or even 6 frames are thereby involved. The customer notes, on these strips, the number of desired re-order prints and specifies the frames. A large number of additional manipulations are necessary to feed the composite object through the photographic printing line. Single strips comprising many orders must be created, joined to form a roll, and fed through the printing lines. Finally, the entire arrangement of strips must be cut according to the individual orders. Even more complicated processing is required when a re-order strip from an earlier order is submitted to the laboratory. This strip is mounted to a data-strip which must be removed before the negative frames can be used. In addition to the risk of damaging the negative by this treatment, a large degree of handle and large amounts of material are required for this procedure.

The disadvantages mentioned directly above are avoided if one proceeds according to the invention, since the memory address (order number) of the very first printing process is available so that the customer can order in an easy and convenient manner. This facilitates self-service re-ordering by the customer (supported by a monitor displaying an overview of the entire film of interest). Telephone orders or other data-line orders such as by E-mail or using Internet are also possible, since the negative frame itself is not needed for the re-order procedure.

There is a worst case in the re-order business using the conventional procedure. Assume a "problem-negative" which is improperly treated by the exposure algorithm of the first printing pass after film development. Of course, in a good quality laboratory, this faulty print will be treated as a re-make and printed with corrections. When the customer later requests a re-order from exactly that frame, all mistakes will be repeated, since the printing algorithms do not normally have access to additional information emerging from the experience of the first printing pass of the "problem negative". (Even if first pass printing information were disposed on the negative strip itself, additional processing of the negative strip and additional laboratory write/read devices would be needed). Should the customers want more than one copy, the entire problem is multiplied. The amount of material and handling result in substantial extra costs, which can be avoided with the device and method of the invention.

In accordance with another aspect of the invention, costs can be reduced by limiting storage times of the image data to keep the total volume (and therefore cost) of the mass storage device low. This procedure is reasonable, since re-order prints are usually requested during a comparatively short time after film development and generation of the first set of prints.

In accordance with another aspect of the invention, invoice calculation of the customer's order is effected by a digital processor based on the memory addresses. In conventional processing the film strips are usually formed into a large roll, which must be separated into single film strips before calculation of prices can be performed. According to the invention, no handling of the negative strips is necessary, since the pricing procedure is governed by the stored data.

In accordance with a further aspect of the invention, the digital processor stores order data and all relevant storage location data of the high volume storage media in an overhead directory and this directory data are used to update and delete the stored image information in the high volume storage devices. This procedure, preferably used in large laboratory environments, facilitates administration of very high data volumes (comprising a large number of mass storage devices or areas). When all storage volume is occupied, the system according to the invention automatically deletes the oldest image data, so no processing by operation personnel is required.

In accordance with another aspect of the invention, a transportable mass storage device is used. The continuous film processor and the device for creating positive images comprise means for handling the mass storage media. First pass positive images and re-order/re-make images can therefore be created with the same device without any additional tools such as a data strip input device and splicing equipment for film strips.

The device in accordance with the invention can be further specified with respect to the total volume of the mass storage unit, wherein image data resulting from more than one day of laboratory production volume can be stored. Experience has shown, that most re-orders are requested by the customers within 6 weeks after the first pass prints. The total capacity of the mass storage unit can therefore be accordingly limited for cost minimization. Re-orders coming into the laboratory after erasure of the respective image data, will be treated as films for first pass printing.

The continuous film processor in accordance with the invention can comprise an input device for order data and a digital processor connected to the data input device and to the mass storage unit such that order data can also be stored on the mass storage unit. Sole input of a number related to the desired frame, allows all devices to produce that positive image without any additional devices, further inputs, supporting material and the associated sources of error described in detail above. Excess frames, which have to be transported through all state of the art re-order devices although no positive print is ordered cause a dramatic decrease in overall productivity. The complete avoidance thereof illustrates the superior performance of the design according to the invention.

The device according to the invention may include a control monitor to check the quality of the ordered images before they are printed. In contrast to state of the art processing, it is thereby possible to view the images before any material is wasted. The mass storage device can thereby contain at least two data storing media devices for the sampled image data, which can be tape cassettes, CD-ROM disks, magneto-optical disks or tapes for data streamers, which can be fed to one or more writing/reading units by a transfer device. The advantages of this design are automatic handling, multi-tasking capability and economical structuring of very large archives, in addition to providing inventory and backup capability.

Further advantages and details of a preferred embodiment of the invention are given in the following description with reference to the drawings.

DESCRIPTION OF THE PREFERRED EMBODIMENT

Figure 1:
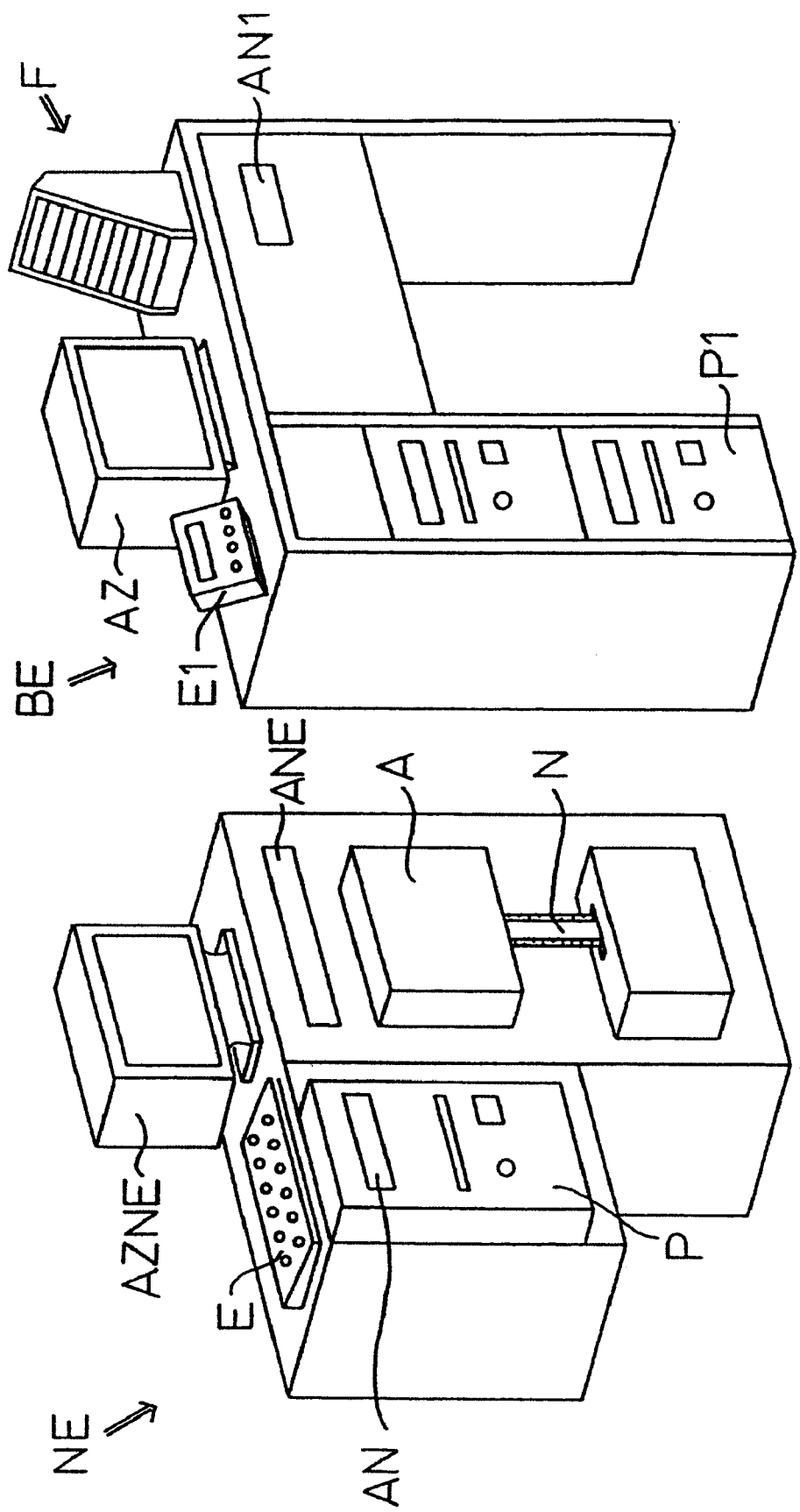
FIG. 1 shows a perspective view of an embodiment according to the invention.

FIG. 1 shows a perspective view of the device according to the invention including a continuous film processor NE and with equipment (positive image output device) F for making positive images, having an image processing facility BE integrated in the workstation region of the positive image output device F. The continuous film processor NE comprises an optical scanning unit A, a take up device AN, a digital data processor P and a data input device E. The positive image output device F comprises an additional take up device AN1. The image processing unit BE comprises a digital processor P1, a display unit AZ and a data input unit E1. The method in accordance with the invention will be explained in detail on the basis of FIG. 2.

Figure 2:
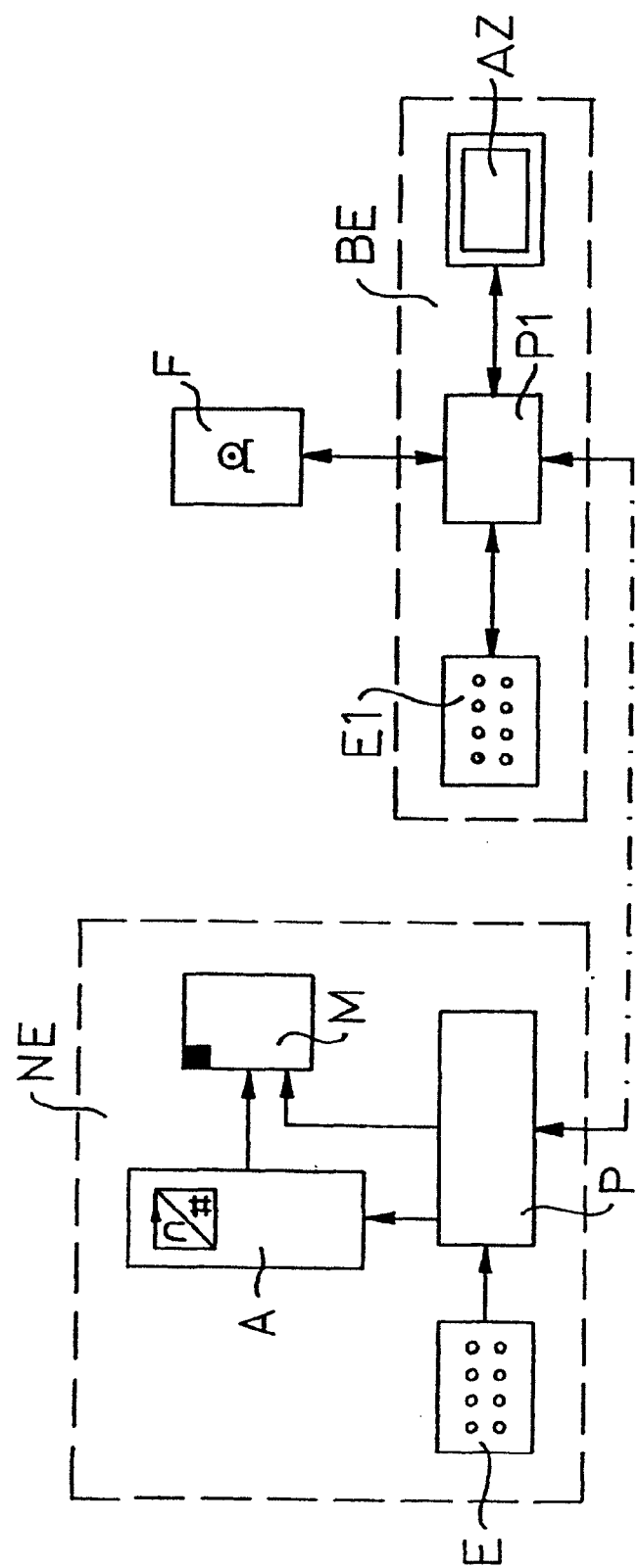
FIG. 2 is a block diagram of a device for realizing the method in accordance with the invention.

The block diagram FIG. 2, of the device in accordance with the invention clarifies the principle of operation thereof. For processing a customer order, the film material (e.g. exposed film rolls inside a canister, box or cassette) is fed to the film processor NE via a suitable adapting unit ANE. Inside the processor, the chemical treatment (film developing) takes place, including all washing processes. After the final drying stage, the frame negatives N are available. Typical feed velocities of continuous film processors (depending on the overall capacity of the machine) are on the order of 1 m/min, corresponding to about 20 frames per minute.

In contrast to state of the art processing where the negatives (possibly formed onto a joined, large film roll) are subsequently used directly in photographic printing devices, the method in accordance with the invention scans, parallel to the film developing process, the frames N on the film, and stores the sampled data. These stored images are used to create the very first positive print and all subsequently ordered prints (re-makes or re-order).

The scanning device A for the frames N is disposed at the exit of the film processor and the sampled image data are written on the mass storage unit M after analog-digital conversion following optional processing by the input and display units and optional application of density and hue correction algorithms. For good image quality, about 3000× 2000 picture elements samples (pixels), are needed which means 18 Mio. picture elements (RGB) per image.

Possible automatically controlled options of the scanner A are:

a) whether the image is correctly aligned
b) image type (e.g. color-picture, black-white picture
c) optimum density and contrast adjustment
d) inspection for image artifacts (Moiree patterns, for example)
e) inspection for mixed text and graphic elements
f) inspection for further image mistakes (e.g. dust spots, scratches, split film, etc.)

Having performed the scanning procedure, each image can be stored in a standard file format (TIF, PICT, JPEG, BMP, etc.). Considering development cycle times of about 3 seconds per frame and taking into account moderate data compression methods, a data rate of only about 2 Mb/second must be fed to the mass storage unit. This number assumes no application of special image compression methods, wherein even lower data rates would result.

If the mass storage unit has a capacity of 1TByte, about 20,000 to 30,000 films can be stored. Using, for example, 8 mm data streamer cassettes which typically store 40 Gbyte each, only 25 units will be need to cover this volume of 1 Tbyte. Of course other high capacity storage media (video cassettes, DLT cassettes, CD-ROM, MOD-disks) including their appropriate write/read devices can also be used.

According to the invention, a memory address will be assigned to each stored frame and is printed together with additional optional information on the positive copy, preferable on its back side. An index print (overview of all frames of the film) can also be made. All order related machine readable data (for example delivery point, order number, information concerning film format, size and style of the copies) can also be stored on the mass storage device. All storage management data (e.g. if and when the images may be erased) can be written in an overall directory managed by the processor P1 which can also calculate invoicing information in dependence on the memory addresses.

The oldest stored pictures can be erased in regular time intervals. This time interval is typically between 6 and 12 weeks. In extremely cost sensitive situations, such as large laboratory environments, this storage time can be reduced to several days. In this case, the device according to the invention could be solely used as a device for improved re-make prints, which still features all the additional advantages (e.g. no handling of negative strips) of the invention.

All conventional image processing techniques can be applied to the stored image data (for example operations on hue, density, saturation, sharpness, smoothing, grain reduction, mosaic, active painting in the picture, red eyes-reduction, cropping etc.). It is therefore useful to display the image itself, including all relevant storage and order data, before it is created on the positive printing device.

Compared to state of the art devices the invention also exhibits a reduced feed through time TDZ for the overall process:

State of the art: $TDZ=TN+n*TVN+Tman+TP+n*TVP$

Invention: $TDZ=TN+n*TVN$ wherein TN is about 12 minutes, TP is about 5 minutes, and $TVP<<TN$. In state of the art techniques (for example in a small laboratory environment, "minilab") the paper feed time TVP per positive print is much shorter than the frame feed time TN in the continuous film processor. TN is usually about 12 minutes, whereas TP is typically about 5 minutes. In order to shorten additional times after film development, state of the art devices need very fast exposure units (printing units) in addition to fast (and therefore very bulky) devices for positive print creation. The time problem is even more severe in the case of minilabs, where 2 films are usually developed by the continuous film processor in parallel, since, after film development, two films are simultaneously available for printing and must be processed as quickly as possible. State of the art processing also requires an additional handling time Tman for 1 or 2 films, or for film rolls comprising about 50 films.

In contrast thereto, with the method according to the invention, "paper processing" to create the positive image can either be performed completely in parallel with film development (wherein slow and cost effective positive imaging devices and be used), or can be timed in such a fashion that the positive imaging process starts exactly at that time when all remaining undeveloped frames on the film require the same amount of development time as the positive device needs to create all pictures of the complete film.

The device in accordance with the invention therefore provides for straight forward processing of re-orders and remakes using one simple memory storage address. All additional copies of the same image therefore have first pass print quality, since they are all made from the same data. All handling processes for operation personal in the lab will be substantially simplified and a large number of error sources and possibilities of damage to the film negatives (scratches, glue-spots, bleaching of dyes caused by exposure to light and heat) are eliminated. In addition, the pass-through time for the customer's order is significantly shortened. Moreover, re-orders can be initiated by the customer in a self-service manner, at the point of delivery or by data transmission order via telephone. The invention also permits disablement of the automatic image erasing mechanism when desired by the customer (for example, recordings serving documentation purposes, wedding pictures etc.).

All embodiments of the invention as shown and described can be important to the invention either individually or in combination. For example, the continuous film processor NE and the positive output device F could be connected by interfaces, so that some components, such as the digital processor P, the data input device and the display unit can be driven using multitasking techniques and must not be doubled. In particular, the mass storage unit may be integrated in the continuous film processor NE or in the positive print device F. The positive print device can be a suitable "photo realistic" device such as a laser printer, a photo-printer, a photo exposure unit, an ink jet printers, etc.

I claim:

1. A method for producing positive images, wherein a film is developed and positive images are produced therefrom, the method comprising the steps of:

a) scanning, during a film development process, all image frames on the film to produce sampled images of all image frames;
b) storing said sampled images, frame by frame, in a digital mass storage device;

c) creating all first pass positive prints exclusively from said stored sampled images; and d) creating all subsequent re-order, re-make prints exclusively from said stored sampled images.

2. The method of claim 1, further comprising mapping each image frame to a memory storage address and printing said memory storage address on a respective positive print.

3. The method of claim 2, wherein said memory storage address is printed on said respective positive print in at least one of a human readable and a machine readable manner for recording an order number.

4. The method of claim 1, further comprising automatically erasing stored image data following a defined storage duration.

5. The method of claim 2, further comprising calculating order costs using a digital processor in response to said memory storage address.

6. The method of claim 5, wherein said digital processor writes order data and memory storage data of an associated digital mass storage device to a directory and further comprising updating and deleting image date through reference to said directory.

7. A device for making positive images from film, the device comprising:

a continuous film processor;

an optical scanning means disposed directly downstream of said continuous film processor, said scanning means completely sampling all image frames of the film;

a mass storage unit;

means for writing all image data of a respective film onto said mass storage unit;

a positive print output device; and means for creating on said positive print output device at least one of all first pass positive prints, all re-order prints, and all re-make prints, exclusively from said image data stored on said mass storage unit.

8. The device of claim 7, wherein said mass storage unit is transportable and wherein said continuous film processor and said positive print output device comprise means for accepting said mass storage unit.

9. The device of claim 7, wherein a memory capacity of said mass storage unit is dimensioned for storing a picture volume in excess of one laboratory production day.

10. The device of claim 7, wherein said continuous film processor comprises an input facility for order data and a digital processor, said digital processor connected to said input facility and said mass storage unit, wherein said order data are written to said mass storage unit.

11. The device of claim 7, further comprising an image processing unit connected to said positive print output device, said image processing unit having a digital processor, an input facility and a display facility, wherein an image which is stored in said mass storage unit is displayed, together with associated order and storage data, prior to printing.

12. The device of claim 7, wherein said mass storage unit comprises at least two storage units for sampled data and further comprising a transfer unit for feeding said at least two storage units to a data read/write device.

13. The device of claim 12, wherein said at least two storage units are one of cassettes, CD-ROM's, MOD's and data streamer tapes.

* * * * *